United States Patent [19]
Aoto et al.

[11] Patent Number: 5,415,139
[45] Date of Patent: May 16, 1995

[54] CONTROL SYSTEM FOR CONTROLLING EXCESS AIR RATIO OF INTERNAL COMBUSTION ENGINE USING A GENERATOR-MOTOR

[75] Inventors: Hiroyuki Aoto, Kariya; Hiroshi Tashiro, Nagoya, both of Japan

[73] Assignee: Nippondenso Co., Ltd., Kariya, Japan

[21] Appl. No.: 300,242

[22] Filed: Sep. 1, 1994

[30] Foreign Application Priority Data

Sep. 2, 1993 [JP] Japan .................................. 5-218692

[51] Int. Cl.6 ............................................. F02B 75/06
[52] U.S. Cl. .................................................. 123/192.1
[58] Field of Search ..................................... 123/192.1

[56] References Cited

U.S. PATENT DOCUMENTS 4,922,869 5/1990 Kadomukai et al. ............. 123/192.1

FOREIGN PATENT DOCUMENTS 64-66431 3/1989 Japan.

Primary Examiner—Noah P. Kamen
Attorney, Agent, or Firm—Cushman, Darby & Cushman

[57] ABSTRACT

A system for controlling an excess air ratio of an internal combustion engine for an automotive vehicle is provided which includes a battery, a generator-motor, an air/fuel sensor, and a controller. The generator-motor is mechanically connected to the engine to establish transmission of torque therebetween, and operates in motor and generator modes. In the motor mode, the generator-motor serves as a motor to provide a given amount of torque to the engine under power supply of the battery. In the generator mode, the generator-motor works as a generator to convert engine torque into electric power for charging the battery. The air/fuel sensor determines an excess air ratio of the engine. The controller activates the generator-motor in the motor mode to control the amount of torque to be supplied to the engine based on the excess air ratio so that an air/fuel ratio falls within a preselected range suitable for purification of exhaust gas of the engine.

9 Claims, 7 Drawing Sheets

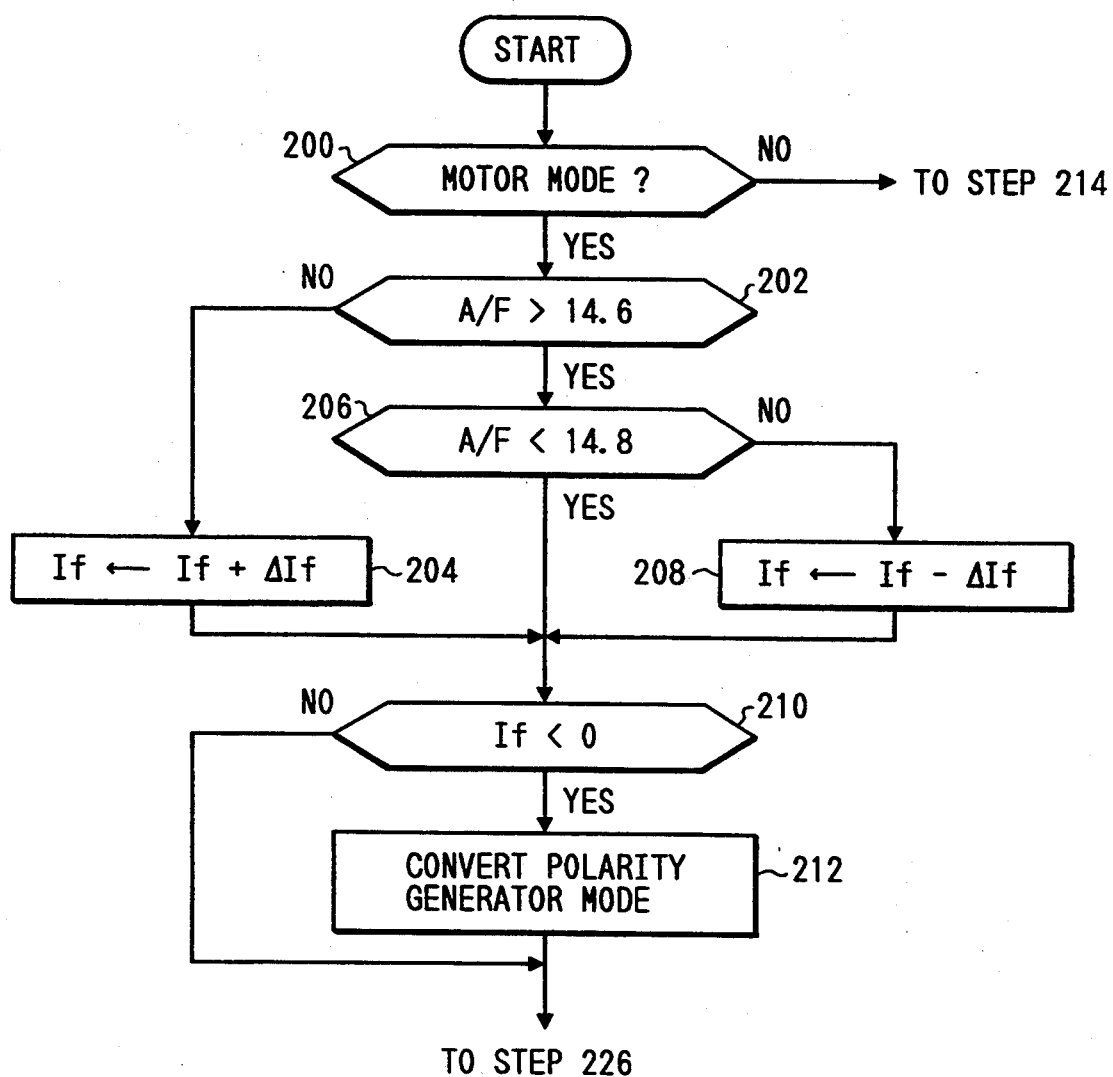

CONTROL SYSTEM FOR CONTROLLING EXCESS AIR RATIO OF INTERNAL COMBUSTION ENGINE USING A GENERATOR-MOTOR

BACKGROUND OF THE INVENTION

1. Technical Field of the Invention

The present invention relates generally to a system for regulating an air/fuel ratio of an internal combustion engine. More particularly, the invention is directed to a control system for controlling an excess air ratio of an internal combustion engine using a generator-motor which is so connected to the engine as to establish the transmission of torque therebetween.

2. Background Art

Japanese Patent First Publication No. 64-66431 teaches a system which controls the operation of a generator-motor (i.e., a dynamotor) to provide an additional torque to an engine according to an opening degree of a throttle valve at an initial stage of acceleration where rising of rotation of the engine will be delayed relative to a variation in depressed position of an acceleration pedal or over the entire stage of acceleration.

The above prior art system, however, encounters a drawback in that the provision of additional torque to the engine improves an acceleration performance, but it will cause the engine speed to change rapidly, yielding a sudden variation in amount of intake air. This results in an undesirable shift in air/fuel ratio, leading to the increase in excess air ratio (i.e., a ratio of an actual amount of intake air to a theoretical amount of intake air) so that harmful exhaust gases are increased.

SUMMARY OF THE INVENTION

It is therefore a principal object of the present invention to avoid the disadvantages of the prior art.

It is another object of the present invention to reduce the amount of harmful exhaust gases due to the variation in flow rate of intake air which will be caused during acceleration.

According to one aspect of the invention, there is provided a system for controlling an excess air ratio of an internal combustion engine for a vehicle which comprises a battery, a generator-motor, an excess air ratio determining means, and a control means. The generator-motor is connected to the internal combustion engine to establish transmission of torque therebetween and operates in motor and generator modes. In the motor mode, the generator-motor serves as a motor to provide a given amount of torque to the engine under power supply of said battery while in the generator mode, the generator-motor works as a generator to convert engine torque into electric power for charging said battery. The excess air ratio determining means detects a preselected operating parameter of the engine to determine an excess air ratio of the engine relative to a desired amount of intake air. The control means activates the generator-motor in the motor mode to control the amount of torque to be supplied to the engine based on the excess air ratio determined by said excess air ratio determining means so that the excess air ratio falls within a preselected range suitable for purification of exhaust gas of the engine.

In the preferred mode, said control means increases the amount of torque, to be applied to the engine, produced by said generator-motor when the excess air ratio determined by said excess air ratio determining means is smaller than a lower limit in said preselected range. Alternatively, the control means decreases the amount of torque, to be applied to the engine, produced by said generator-motor when the excess air ratio determined by said excess air ratio determining means is greater than an upper limit in said preselected range.

The excess air ratio determining means measures the concentration of oxygen contained in an exhaust gas of the engine to derive an air/fuel ratio for determining the excess air ratio.

An airflow sensor means may further be provided for determining a variation in mass of intake air introduced into the engine. The control means determines a first amount of torque to be applied to the engine based on the variation in mass of intake air and a second amount of torque for correcting the first amount of torque based on the excess air ratio, and controls said generator-motor to provide torque of an amount determined based on the first and second amounts of torque to the engine.

The second amount of torque is so determined as to decrease the first amount of torque when the excess air ratio is greater than a preselected first value. In addition, when the excess air ratio is less than a preselected second value smaller than the first value, the second amount of torque is so determined as to increase the first amount of torque.

The excess air ratio determining means determines an air/fuel ratio for deriving the excess air ratio of the engine. When the air/fuel ratio is smaller than a first threshold value, the control means increases the amount of torque to be supplied to the engine by a first degree. When the air/fuel ratio is more than a second threshold value greater than the first threshold value, the control means decreases the amount of torque to be supplied to the engine by a second degree.

Additionally, when said generator-motor is operating in the generator mode and the air/fuel ratio is smaller than a first threshold value, the control means decreases an exciting current of said generator-motor to reduce an output torque. When said generator-motor is operating in the generator mode and the air/fuel ratio is more than a second threshold value greater than the first threshold value, the control means increases the exciting current of said generator-motor to increase the output torque.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for the purpose of explanation and understanding only.

In the drawings:

FIGS. 7 and 8 show a flowchart of an alternative control program performed by an excess air ratio control system of the invention.

DESCRIPTION OF THE PREFERRED EMBODIMENT

Figure 1:
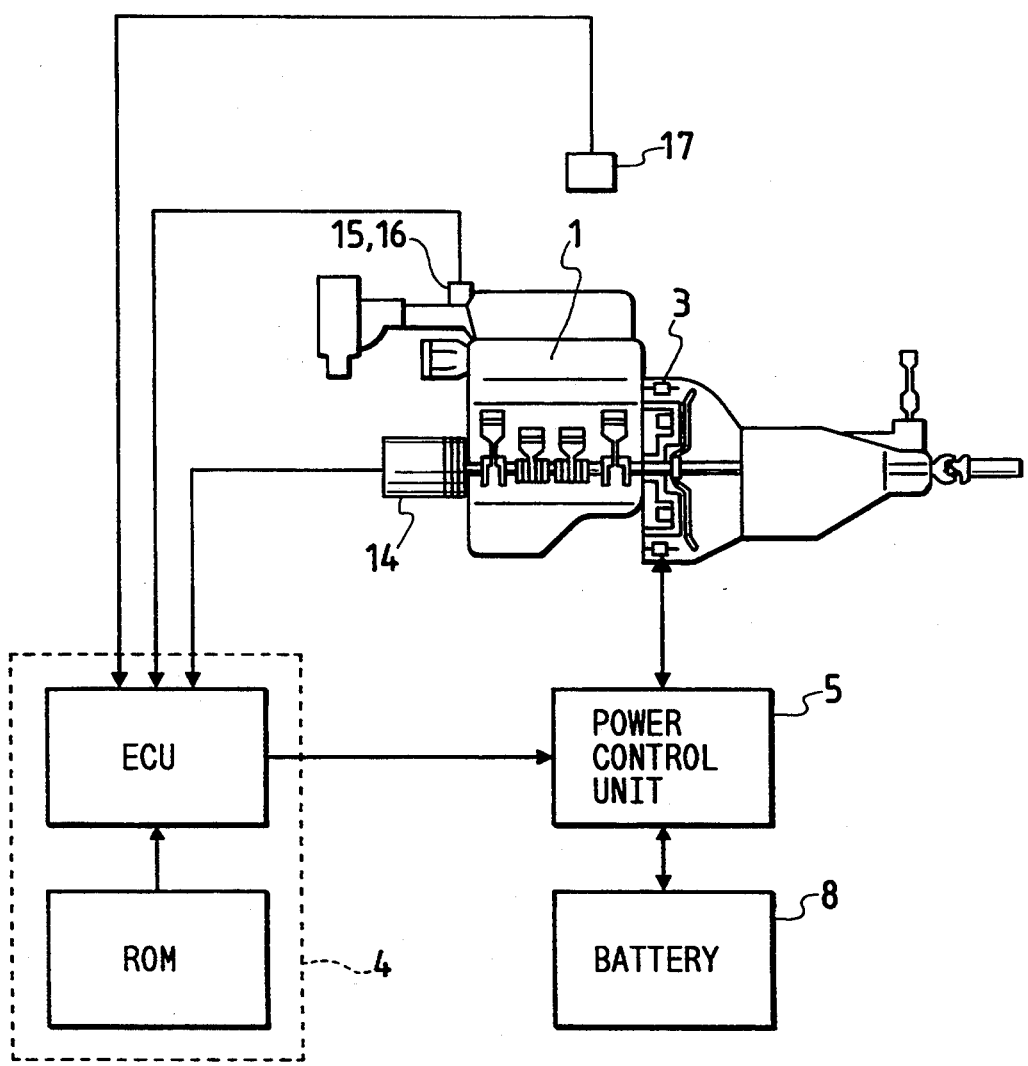
FIG. 1 is a block diagram which shows an excess air ratio control system for an internal combustion engine according to the present invention.

Referring now to the drawings, wherein like numbers refer to like parts in several views, particularly to FIG. 1, there is shown a control system 10 for optimizing an excess air ratio introduced into an internal combustion engine 1 of an automotive vehicle.

The control system 10 includes generally a generator-motor (i.e., a dynamotor) 3, a battery 8, a power control unit 5, a crank angle sensor 14, an airflow sensor 15, a temperature sensor 16, an A/F (air/fuel ratio) sensor 17, and a control unit 4.

The generator-motor 3 is mechanically connected to a crank shaft of the engine 1 to operate in two modes of operation; a motor mode and a generator mode. In the motor mode, the generator-motor 3 serves as a motor which provides a positive torque to the engine 1 under power supply from the battery 8. In the generator mode, the generator-motor 3 works as a generator to convert engine torque into electric power for charging the battery 8. The power control unit 5 is adapted for selecting between the motor mode and the generator mode of the generator-motor 3 and controls a magnetic field current thereof. The crank angle sensor 14 is provided with an absolute rotary encoder which monitors an absolute angular position of a crank shaft of the engine 1. The airflow sensor 15 measures the flow rate of intake air introduced into the engine 1. The temperature sensor 16 detects the temperature of the intake air. The A/F sensor 17 is attached to a portion of an exhaust pipe of the engine 1 to detect a parameter used to determine an excess air ratio $\lambda$ (i.e., an actual flow rate of intake air/a desired flow rate of intake air). The control unit 4 includes an engine control unit (ECU) provided with an engine control computer and a ROM storing therein various maps, as will be described later, and is responsive to detection signals from the sensors 14, 15, 16, and 17 to control an operation of the generator-motor 5 through the power control unit 5.

Figure 2:
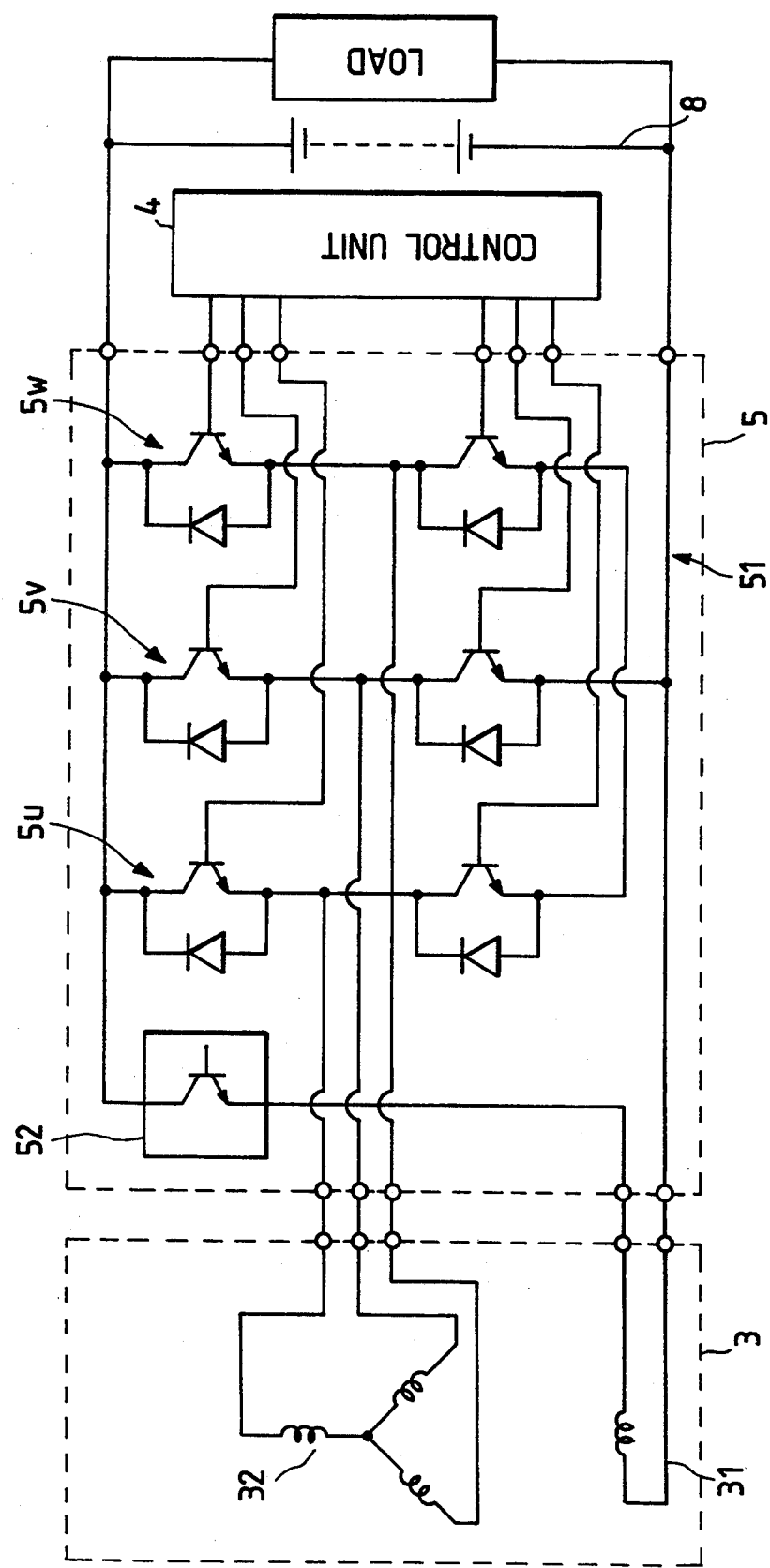
FIG. 2 is a circuit diagram of the excess air ratio control system shown in FIG. 1.

Referring to FIG. 2, an electric circuit of the control system 10 is shown.

The generator-motor 3 includes a three-phase synchronous motor. Its rotor core has an exciting coil 31 wound therearound, while a stator coil has star-connected three-phase armature coils 32 wound therearound.

The power control unit 5 includes a three-phase inverter circuit 51 controlled to be activated based on a crank angle measured by the crank angle sensor 14, and an exciting current-switching transistor 52 for controlling the flow of an exciting current. The three-phase inverter circuit 51 includes inverters 5u, 5v, and 5w connected to the battery 8. Each inverter 5u, 5v, 5w has a pair of npn transistors (or Insulated Gate Bipolar Transistors (IGBTs)) connected in series and diodes arranged in parallel to the transistors, respectively. Output terminals of the inverters 5u, 5v, and 5w connect with output terminals of the three-phase armature coil 32, respectively.

The exciting coil 31 is connected at its end to a negative terminal of the battery 8 while the other end connects with a positive terminal of the battery 8 through the exciting current-switching transistor 52.

With the above arrangements, the ECU of the control unit 4 provides control signals to control the switching timing of each transistor for selectively establishing the motor mode and the generator mode of the generator-motor 3 and to turn on and off the exciting current-switching transistor 52 to control a duty cycle of the exciting current supplied to the exciting coil 31. The operation of each component part shown is well known in the art and further explanation thereof in detail will be omitted here.

Under the above control, the generator-motor 3 is driven by the battery 8 to provide torque to the engine 1 in the motor mode or receives torque from the engine to charge the battery 8 in the generator mode.

Figure 3:
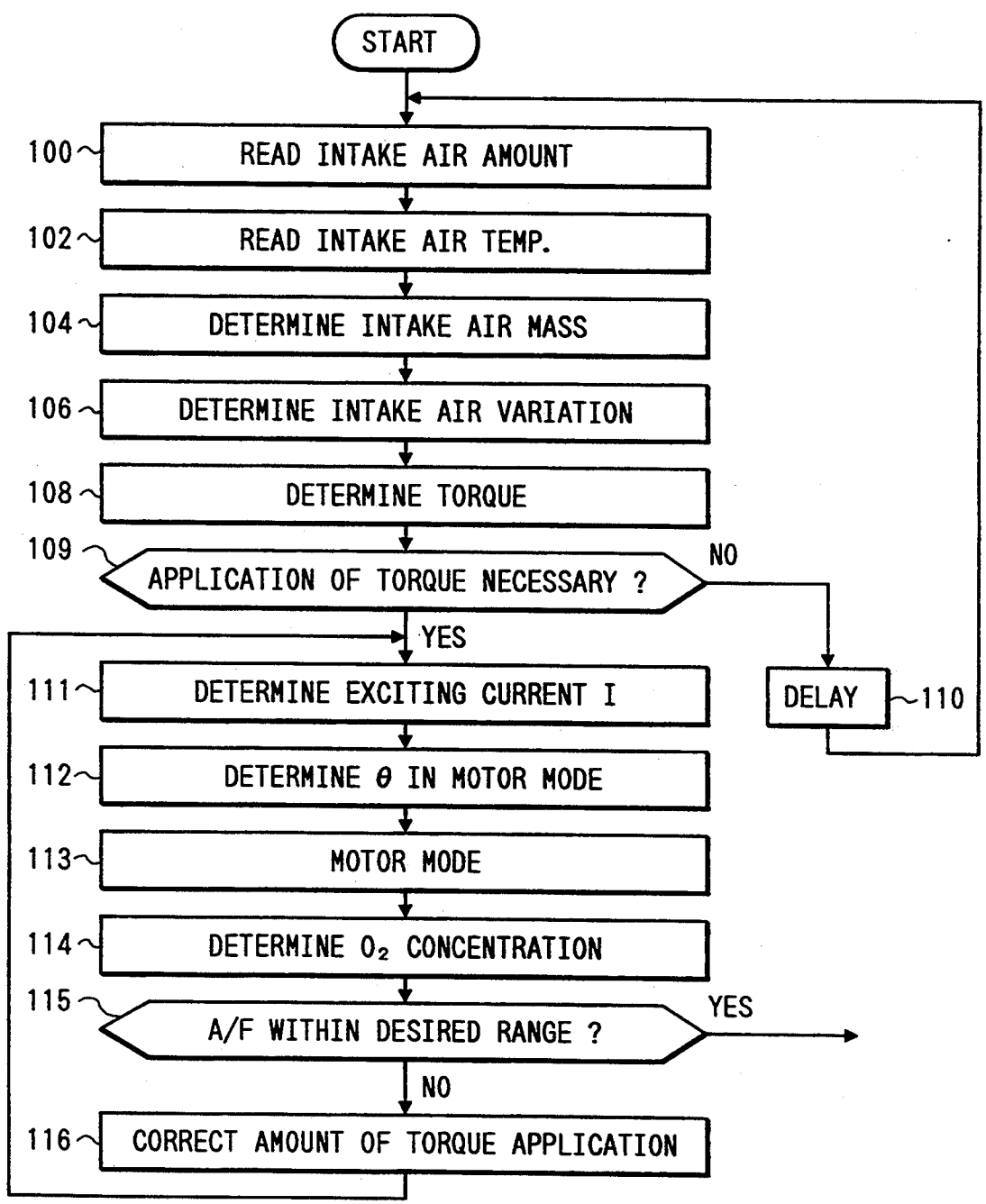
FIG. 3 is a flowchart of a program performed by a control unit of the excess air ratio control system shown in FIG. 1.

Referring to FIG. 3, there is shown a flowchart of a program or sequence of logical steps performed by the control system 10 of the invention.

Figure 4:
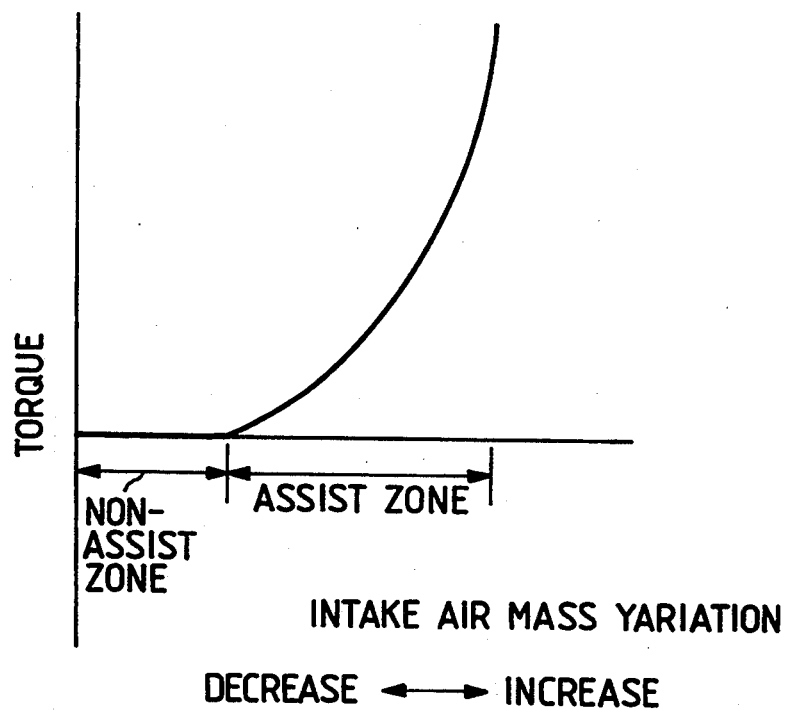
FIG. 4 is a graph which shows a relation between a variation in intake air and the degree of torque to be applied to an engine.

After entering the program, the routine proceeds to step 100 wherein an intake air flow rate QA detected by the airflow sensor 15 is read. In step 102, an intake air temperature T measured by the temperature sensor 16 is read. The routine then proceeds to step 104 wherein an intake air mass is determined by looking up a map memorized in the ROM based on the intake air flow rate QA and the intake air temperature T. Step 104 is repeated at regular intervals. The routine then proceeds to step 106 wherein a difference between the current intake air mass and the previous intake air mass derived one measurement cycle before, that is, a variation in the intake air mass is determined. Subsequently, in step 108, the amount of torque to be applied to the engine 1 is determined by look-up using a map, as shown in FIG. 4, based on the intake air mass variation derived in step 106. The routine then proceeds to step 109 wherein it is determined whether it is required to apply torque to the engine 1 or not in the following manner. If the amount of torque to be applied to the engine (i.e., the intake air mass variation) derived in step 108 is small so that it falls within a non-assist zone shown in FIG. 4, meaning that it is not necessary to provide an additional torque to the engine 1, then the routine proceeds to step 110 and returns back to step 100 after a predetermined period of time.

Alternatively, if the amount of torque to be applied to the engine 1 derived in step 108 falls in an assist zone, then the routine proceeds to step 111 wherein a duty cycle of an exciting current I required for the generator-motor 3 to produce the amount of torque determined in step 108, is determined. In step 112, an electrical angle $\theta e$ where an inverter element to be phase-controlled is activated, is determined by look-up using a map based on the crank angle detected by the crank angle sensor 14. Note that the electrical angle $\theta e$ represents an phase angle between a vector of each magnetic pole of the rotor core of the generator-motor 3 whose angular position is fixed to a given crank angle and a vector of a given phase voltage (e.g., u-phase voltage Vu) of three-phase armature voltages, and is expressed in terms of an crank angle of on-timing of the u-phase voltage Vu. Subsequently, the routine proceeds to step 113 wherein the generator-motor 3 is activated in the motor mode to provide the engine 1 with an additional torque of a degree determined by the exciting current I and the electrical angle θe. A similar operation of the generator-motor is taught in U.S. patent application Ser. No. 08/173,117, filed on Dec. 27, 1993, assigned to the same assignee as in this application, disclosure of which is incorporated herein by reference.

Figure 5:
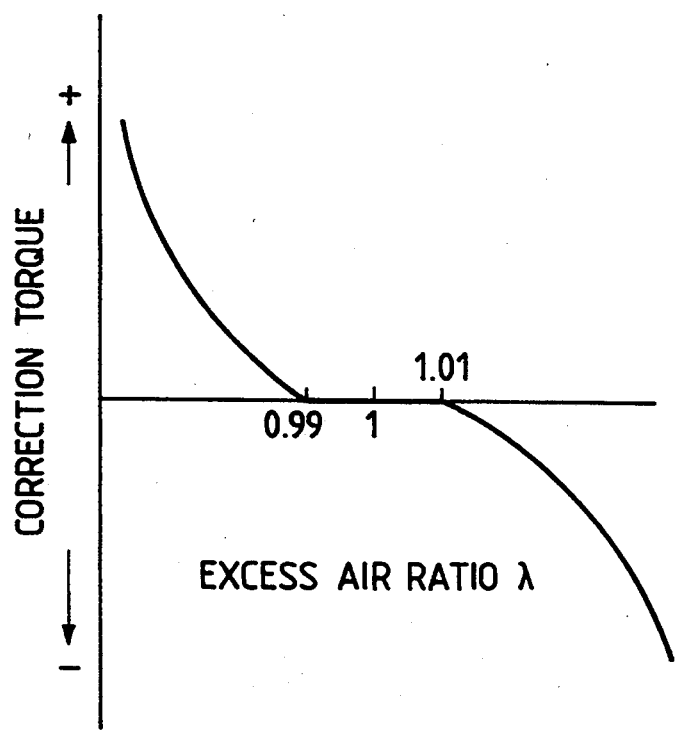
FIG. 5 is a graph which shows a relation between a variation in excess air ratio and a correction torque.

After step 113, the routine proceeds to step 114 wherein the concentration of oxygen remaining in exhaust gases of the engine 1 is measured by the A/F sensor 17. The routine then proceeds to step 115 wherein it is determined whether an air/fuel ratio A/F falls within a range from 14.5 to 15.0 (preferably, from 14.6 to 14.8) or not based on the concentration of oxygen determined in step 114. If the air/fuel ratio A/F falls in that range meaning that the amount of harmful exhaust gas is small, then the routine returns back to step 100. Alternatively, if the air/fuel ratio A/F falls out of that range, the excess air ratio λ is derived based on the concentration of oxygen detected by the A/F sensor 17 and a correction value for the amount of applying torque derived in step 108 is determined using a map, as shown in FIG. 5. In step 116, the torque of an amount corrected based on the excess air ratio λ is given to the engine 1.

As appreciated from FIG. 5, when the excess air ratio λ is smaller than a threshold value 0.99, the generator-motor 3 is so adjusted as to increase a positive torque to heighten the engine speed for increasing the intake air. Therefore, when the generator-motor 3 is operating in the motor mode, a motor torque is increased, while when the generator-motor 3 is in the generator mode, it is controlled to decrease its electric power-generating torque or alternatively switched to the motor mode. Conversely, when the excess air ratio λ is greater than a threshold value 1.01, the generator-motor 3 is so corrected as to increase a negative torque to lower engine speed for decreasing the intake air. Thus, when the generator-motor 3 is operating in the generator mode, the electric power-generating torque is increased, while when the generator-motor 3 is in the motor mode, it is controlled to decrease the motor torque or alternatively switched to the generator mode.

Under the above control, the excess air ratio λ, or the air/fuel ratio A/F is always held in the range from 14.5 to 15.0 (preferably, from 14.6 to 14.8) suitable for treatment through three way catalyst regardless of variations in engine operating condition.

Figure 6A:
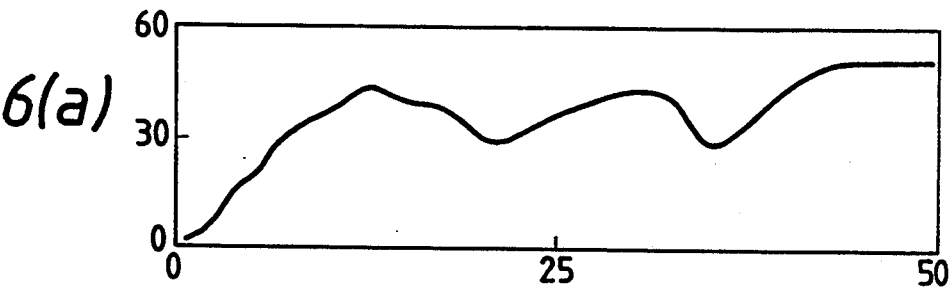
FIG. 6(a) is a graph which shows the variation in flow rate of intake air.
Figure 6B:
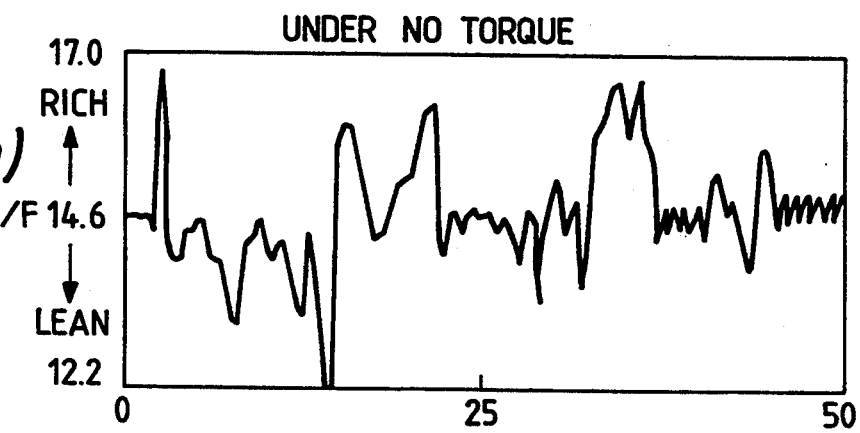
FIG. 6(b) is a graph which shows the variation in air/fuel ratio A/F when no torque is provided to an engine.
Figure 6C:
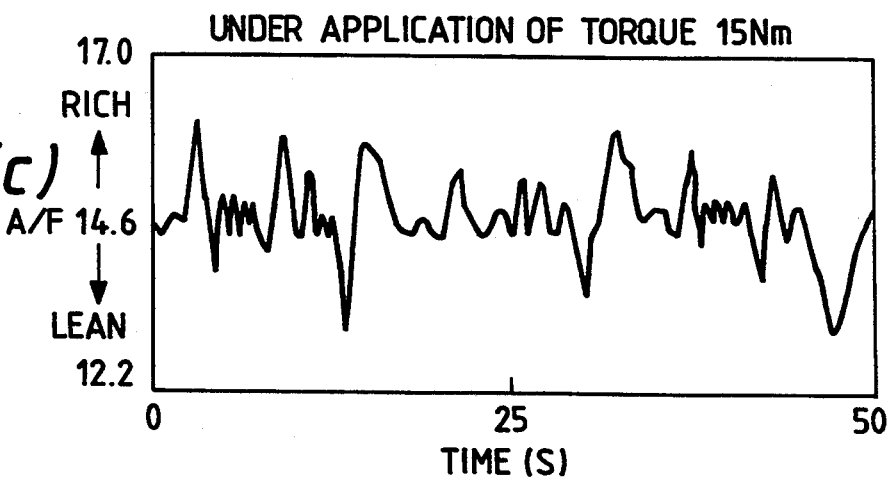
FIG. 6(c) is a graph which shows the variation in air/fuel ratio A/F on application of a maximum torque of 15 Nm to an engine.

FIGS. 6(a), 6(b), and 6(c) represent the experimental results. FIG. 6(a) shows the variation in flow rate of intake air. FIG. 6(b) shows the variation in air/fuel ratio A/F when no torque is provided to the engine 1. FIG. 6(c) shows the variation in air/fuel ratio A/F on application of a maximum torque of 15 Nm to the engine 1. It is found that the application of torque reduces the variation in air/fuel ratio A/F extremely.

Figure 8:
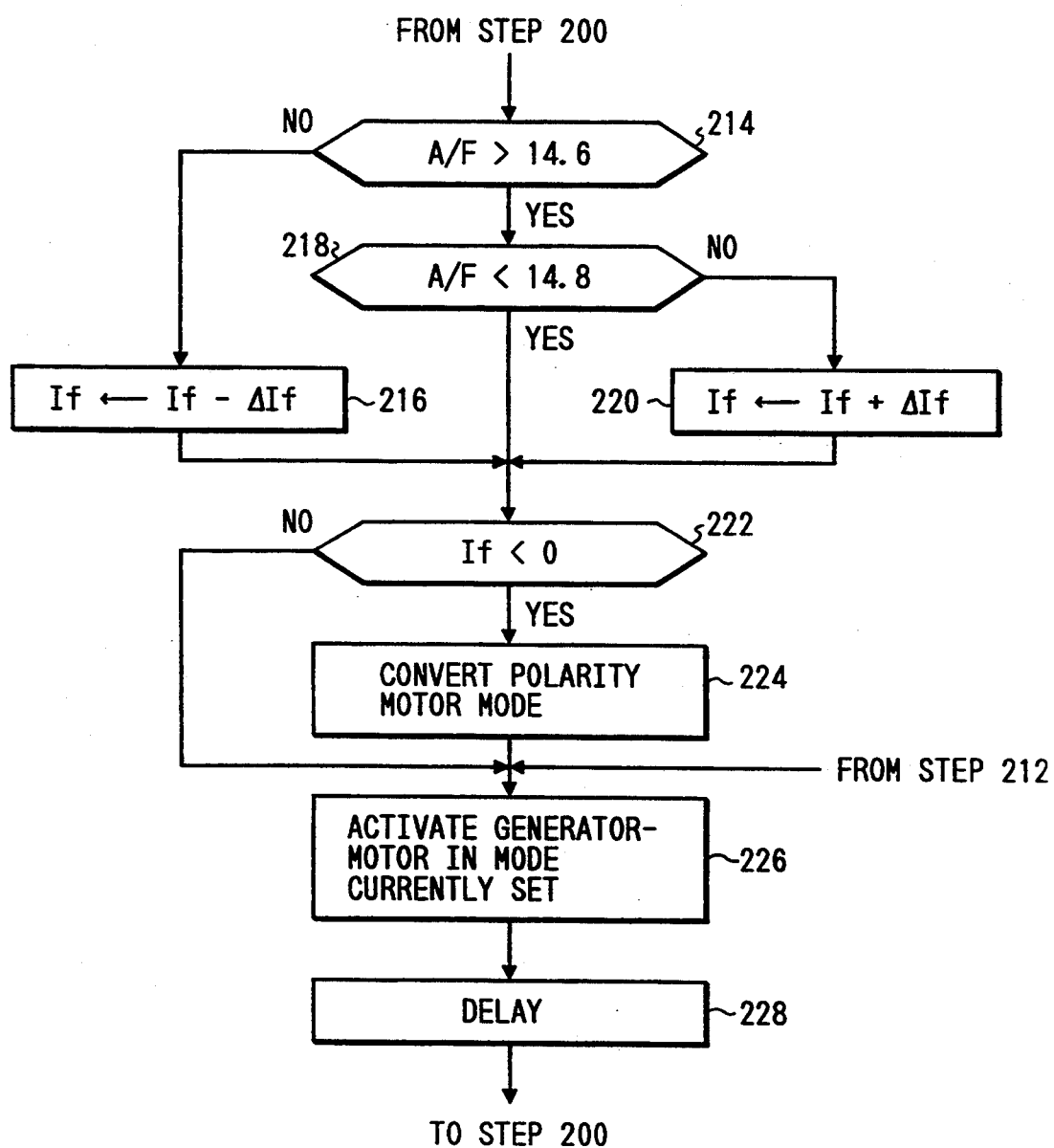

Referring to FIGS. 7 and 8, there is shown an alternative embodiment of the air/fuel ratio A/F control.

After the program is initiated, the routine proceeds to step 200 wherein it is determined whether a motor flag is set, that is, the generator-motor 3 is in the motor mode or not. If a NO answer is obtained concluding that the generator-motor 3 is operating in the generator mode, then the routine proceeds to step 214 shown in FIG. 8. Alternatively, if a YES answer is obtained, then the routine proceeds to step 202 wherein it is determined whether the air/fuel ratio A/F is greater than 14.6 or not. If a NO answer is obtained, then the routine proceeds to step 204 wherein a correction current ΔI is added to the previous exciting current I derived one program cycle before to update it. Alternatively, if a YES answer is obtained in step 202 meaning that the air/fuel ratio A/F is more than 14.6, then the routine proceeds to step 206 wherein it is determined whether the air/fuel ratio A/F is smaller than 14.8 or not. If a NO answer is obtained, then the routine proceeds to step 208 wherein ΔI is subtracted from the previous exciting current I derived one program cycle before to update it. Alternatively, if a YES answer is obtained in step 206 meaning that the air/fuel ratio A/F is less than 14.8, then the routine proceeds directly to step 210 wherein it is determined whether the exciting current I represents a negative value or not. If a YES answer is obtained (I<0), the routine then proceeds to step 212 wherein the sign (i.e., polarity) of the exciting current I is converted into the positive one and a generator flag is set. The routine then proceeds directly to step 226.

If, in step 200, the motor flag is not set and the generator flag is set, then the routine proceeds to step 214 wherein it is determined whether the air/fuel ratio A/F is greater than 14.6 or not. If a NO answer is obtained, then the routine proceeds to step 216 wherein ΔI is subtracted from the previous exciting current I derived one program cycle before to update it for reducing an output torque of the generator-motor 3. Alternatively, if a YES answer is obtained in step 214 meaning that the air/fuel ratio A/F is more than 14.6, then the routine proceeds to step 218 wherein it is determined whether the air/fuel ratio A/F is smaller than 14.8 or not. If a NO answer is obtained, then the routine proceeds to step 220 wherein ΔI is added to the previous exciting current I derived one program cycle before to update it. Alternatively, if a YES answer is obtained in step 218 meaning that the air/fuel ratio A/F is smaller than 14.8, then the routine proceeds directly to step 222 wherein it is determined whether the exciting current I is smaller than zero or not. If a YES answer is obtained (I<0), the routine then proceeds to step 224 wherein the polarity of the exciting current I is converted into the positive one and the motor flag is set. Alternatively, if a NO answer is obtained in step 222, then the routine goes directly to step 226.

In step 226, the generator-motor 3 is activated with the exciting current I in the generation mode or the motor mode, whichever corresponds to the flag currently set. Subsequently, the routine proceeds to step 228 wherein the routine waits for a predetermined time interval, and then returns back to step 200.

In the above manner, the air/fuel ratio A/F is optimized even in the generator mode for power supply to some electric load incorporated in an automotive vehicle or for suppressing vehicle vibrations or in the motor mode for enhancing the performance of acceleration.

While in the above embodiment, the amount of torque to be applied to the engine 1 is changed by controlling the exciting current I, it may alternatively be changed by modifying the electrical angle θe of a voltage applied to the armature coil of the generator-motor 3. The electrical angle θe, as discussed above, represents an phase angle between a vector of each magnetic pole of the rotor core of the generator-motor 3 whose angular position is fixed to a given crank angle and a vector of a given phase voltage (e.g., u-phase voltage Vu) of three-phase armature voltages, and is expressed in terms of an crank angle of on-timing of the u-phase voltage Vu. Therefore, by determining the number of poles of the generator-motor 3 and the on-timing of the u-phase voltage Vu, the off-timing of the u-phase voltage Vu and the on and off-timings of a v-phase voltage Vv and a w-phase voltage Vw are derived. Therefore, in this case, the operation of the generator-motor may be controlled by switching each transistor of the three-phase inverter circuit 51 with the above timings based on a crank angle detected by the crank angle sensor 14.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A system for controlling an excess air ratio of an internal combustion engine for a vehicle comprising:
   a battery;
   a generator-motor connected to the internal combustion engine to establish transmission of torque therebetween, said generator-motor operating in motor and generator modes, the motor mode being such that the generator-motor serves as a motor to provide a given amount of torque to the engine under power supply of said battery, the generator mode being such that the generator-motor works as a generator to convert engine torque into electric power for charging said battery;
   excess air ratio determining means for detecting a preselected operating parameter of the engine to determine an excess air ratio of the engine relative to a desired amount of intake air; and
   control means for controlling an operation of said generator-motor, said control means activating said generator-motor in the motor mode to control the amount of torque to be supplied to the engine based on the excess air ratio determined by said excess air ratio determining means so that the excess air ratio falls within a preselected range suitable for purification of exhaust gas of the engine.

2. A system as set forth in claim 1, wherein said control means increases the amount of torque, to be applied to the engine, produced by said generator-motor when the excess air ratio determined by said excess air ratio determining means is smaller than a lower limit in said preselected range.

3. A system as set forth in claim 1, wherein said control means decreases the amount of torque, to be applied to the engine, produced by said generator-motor when the excess air ratio determined by said excess air ratio determining means is greater than an upper limit in said preselected range.

4. A system as set forth in claim 1, wherein said excess air ratio determining means measures the concentration of oxygen contained in an exhaust gas of the engine to derive an air/fuel ratio for determining the excess air ratio.

5. A system as set forth in claim 1, further comprising airflow sensor means for determining a variation in mass of intake air introduced into the engine, said control means determining a first amount of torque to be applied to the engine based on the variation in mass of intake air and a second amount of torque for correcting the first amount of torque based on the excess air ratio, said control means controlling said generator-motor to provide torque of an amount determined based on the first and second amounts of torque to the engine.

6. A system as set forth in claim 5, wherein the second amount of torque is so determined as to decrease the first amount of torque when the excess air ratio is greater than a preselected first value.

7. A system as set forth in claim 6, wherein the second amount of torque is so determined as to increase the first amount of torque when the excess air ratio is less than a preselected second value smaller than the first value.

8. A system as set forth in claim 1, wherein said excess air ratio determining means determines an air/fuel ratio for deriving the excess air ratio of the engine, when the air/fuel ratio is smaller than a first threshold value, the control means increasing the amount of torque to be supplied to the engine by a first degree, when the air/fuel ratio is more than a second threshold value greater than the first threshold value, the control means decreasing the amount of torque to be supplied to the engine by a second degree.

9. A system as set forth in claim 1, wherein said excess air ratio determining means determines an air/fuel ratio for deriving the excess air ratio of the engine, when said generator-motor is operating in the generator mode and the air/fuel ratio is smaller than a first threshold value, the control means decreasing an exciting current of said generator-motor to reduce an output torque, when said generator-motor is operating in the generator mode and the air/fuel ratio is more than a second threshold value greater than the first threshold value, the control means increasing the exciting current of said generator-motor to increase the output torque.

* * * * *

UNITED STATES PATENT AND TRADEMARK OFFICE
CERTIFICATE OF CORRECTION

PATENT NO.  : 5,415,139
DATED       : May 16, 1995
INVENTOR(S) : AOTA et al.

It is certified that error appears in the above-identified patent and that said Letters Patent is hereby corrected as shown below:

ON THE COVER PAGE:

Reads:

[75]  Inventors:  Hiroyuki Aoto, Kariya; Hiroshi Tashiro, Nagoya, both of Japan

Should Read:

[75]  Inventors:  Hiroyuki Aota, Kariya; Hiroshi Tashiro, Nagoya, both of Japan

Signed and Sealed this

Thirty-first Day of October 1995

Attest:

BRUCE LEHMAN

*Attesting Officer*    *Commissioner of Patents and Trademarks*